United States Patent
Stearns et al.

(10) Patent No.: US 7,129,496 B2
(45) Date of Patent: Oct. 31, 2006

(54) METHOD AND SYSTEM FOR SCATTERED COINCIDENCE ESTIMATION IN A TIME-OF-FLIGHT POSITRON EMISSION TOMOGRAPHY SYSTEM

(75) Inventors: Charles William Stearns, New Berlin, WI (US); Ravindra Mohan Manjeshwar, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 11/040,088

(22) Filed: Jan. 21, 2005

(65) Prior Publication Data

US 2006/0163485 A1   Jul. 27, 2006

(51) Int. Cl.
*G01T 1/164* (2006.01)
(52) U.S. Cl. ............................................. 250/363.03
(58) Field of Classification Search ............ 250/363.03
See application file for complete search history.

(56) References Cited

U.S. PATENT DOCUMENTS 6,462,342 B1   10/2002   Stearns
6,590,213 B1   7/2003   Wollenweber
6,674,083 B1 *  1/2004   Tanaka et al. ......... 250/363.03
2003/0047687 A1   3/2003   Wollenweber

OTHER PUBLICATIONS

Moses, W. W., "Time of Flight in PET Revisited," IEEE Transactions on Nuclear Science, vol. 50, No. 5 (Oct. 2003), pp. 1325-1330, vol. 50, Issue 5, Part 2.*
Kimdon et al., "Effect of Random and Scatter Fractions in Variance Reduction using Time-of-Flight Information," Nuclear Science Symposium Conference Record, 2003 IEEE vol. 4 (Oct. 2003), pp. 2571-2573.*
Ollinger, John M., Model-based Scatter Correction for Fully 3D PET, Phys. Med. Biol. 41, 1996, 153-176, printed in UK.
Conti, M., Hamill, J., Luk, W.K., Component-based Normalization for Panel Detector PET Scanners, Nuclear Science, IEEE Transaction, Feb. 2004, 16-20, vol. 51, Issue 1, published in USA.

* cited by examiner

*Primary Examiner*—David Porta
*Assistant Examiner*—Mindy Vu
(74) *Attorney, Agent, or Firm*—Small Patent Law Group; Dean D. Small (57) ABSTRACT

A method and system for controlling a positron emission tomography (PET) system is disclosed. The method includes acquiring image data and time-of-flight information from a PET system during an imaging scan. Further, the method includes performing scatter correction on the image data using the time-of-flight information.

20 Claims, 5 Drawing Sheets

METHOD AND SYSTEM FOR SCATTERED COINCIDENCE ESTIMATION IN A TIME-OF-FLIGHT POSITRON EMISSION TOMOGRAPHY SYSTEM

BACKGROUND OF THE INVENTION

This invention relates generally to positron emission tomography (PET) systems, and more particularly to performing scatter correction in time-of-flight (TOF) PET systems.

A PET system typically includes a detector ring assembly having rings of detectors that encircle a patient or an object. The detectors detect photons emitted from an annihilation point in the object. Only photons that are detected by two detectors within a predefined time gap are recorded as coincident photons. The two detectors, together, are called a detector pair. When a detector pair detects coincident photons it is assumed that they arose from an annihilation point on the line between the two detectors. When a number of such events are acquired, one of a number of known reconstruction algorithms is applied to estimate the distribution of annihilations within the patient.

A photon generated by an annihilation event may scatter after collision with an atom present in the object or in the environment. If a detector pair detects coincident photons after one or both of the photons scatters, the event is referred to as a scatter coincidence. In a scatter coincidence, the observed line of response is different from the actual path of the unscattered photons. Thus, in order to reconstruct an accurate image of the object being scanned, the acquired data must be corrected for scatter coincidences.

To address the problem of scatter coincidence, Model-Based Scatter Correction (MBSC) methods are known. The inputs to MBSC algorithms are typically an estimate of the emission activity distribution and the attenuation map of the object. The MBSC algorithm estimates the probability distribution of singly scattered coincidences that are the coincidences in which exactly one of the coincident photon scatters. For estimating this probability distribution, the algorithm typically uses the Klein-Nishina equation. Further, the contribution of multiple scattered coincidences is estimated from the single scatter estimate. Multiple scatter coincidences are those in which either both coincident photons scatter or one photon scatters at least twice.

A 3D MBSC algorithm is also known. The algorithm loops through all permutations of an unscattered photon (e.g., over an angle from 0 to $2\pi$) and over all values of radius that intersect the imaged object. In the algorithm, for each unscattered photon detected by a first detector, the probability of scatter at every point (the point termed as scatter point) on the line joining the annihilation point and first detector in the body is calculated. Also, the probability of detecting a scattered photon by a second detector also is calculated. The probability is calculated for each second detector within the field-of-view of the first detector in the detector ring of the PET system. The number of annihilation events recorded by the detector pair is then incremented by a value proportional to the product of the determined probabilities to obtain an estimate of single coincidence. Multiple coincidences are estimated on the basis of the estimate of single coincidences.

It is also known that a PET system can be improved by incorporating TOF information into the data acquisition and reconstruction. In TOF acquisition, each coincidence event is recorded with the difference between the photon detection times in the detector pair. If that difference is measured to be $\Box t$, it is inferred that the annihilation event occurred at a distance approximately $\Box t^*(c/2)$ from the midpoint of the line between the two detectors, where c is the speed of light. TOF reconstruction algorithms are known which can utilize this information and produce an image that has less statistical noise than an image acquired and reconstructed without TOF information. These algorithms, however, will produce inaccurate images of the annihilation distribution if the input data is not corrected for the occurrence of scatter coincidences in the TOF data.

There are several known methods for scatter correction that estimate only the number of scatter coincidences in a detector pair, without regard to any TOF information. For example, a TOF scatter correction technique is known and that uses a simple scaling of the non-TOF scatter estimate for the various TOF data elements. However, using only a count of the number of events, or a simple scaling technique, may result in less than acceptable image resolution, particularly when imaging smaller objects.

BRIEF DESCRIPTION OF THE INVENTION

In one exemplary embodiment of the invention, a method for controlling a positron emission tomography (PET) system is provided. The method includes acquiring image data and time-of-flight information from a PET system during an imaging scan. Further, the method includes performing scatter correction on the acquired image data using the acquired time-of-flight information.

In another exemplary embodiment of the invention, a positron emission tomography (PET) system is provided. The PET system includes a plurality of detector elements for performing a PET scan. The PET system further includes a processor configured to receive image data and time-of-flight information from the plurality of detector elements during an imaging scan using the PET system and to scatter correct the acquired image data using the acquired time-of-flight information.

DETAILED DESCRIPTION OF THE INVENTION

Various embodiments of the invention generally provide a method and a system for controlling a positron emission tomography (PET) system.

Figure 1:
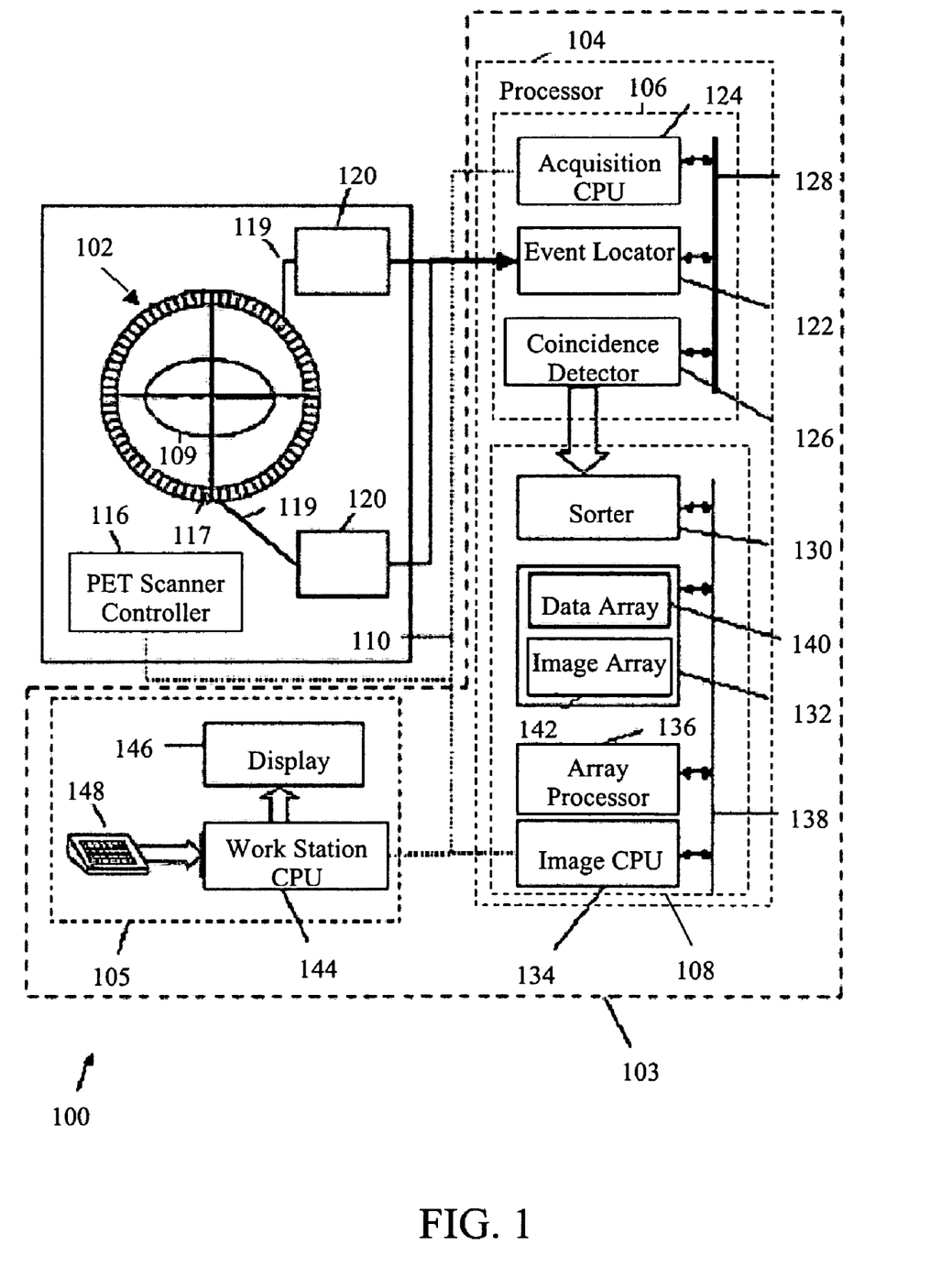
FIG. 1 is a block diagram illustrating a positron emission tomography (PET) system in accordance with an exemplary embodiment of the invention.

FIG. 1 is a block diagram of an exemplary embodiment of a PET system 100 in which various embodiments of the invention may be implemented. PET system 100 includes a plurality of detector ring assemblies. One such detector ring assembly, detector ring assembly 102, is illustrated in FIG. 1. PET system 100 further includes a controller 103 to control normalization and image reconstruction processes. Controller 103 includes a processor 104 and an operator workstation 105. Processor 104 includes a data acquisition processor 106 and an image reconstruction processor 108, which are interconnected via a communication link 110. PET system 100 acquires scan data and transmits the data to data acquisition processor 106. The scanning operation is controlled from operator workstation 105. The data acquired by data acquisition processor 106 is reconstructed using image reconstruction processor 108.

Detector ring assembly 102 includes a central opening, in which an object 109 may be positioned, using, for example, a motorized table, that is aligned with the central axis of detector ring assembly 102. This motorized table moves object 109 into the central opening of detector ring assembly 102 in response to one or more commands received from operator workstation 105. A PET scanner controller 116, also referred to as the gantry controller, is provided (e.g., mounted) within PET system 100. PET scanner controller 116 responds to the commands received from operator workstation 105 through communication link 110. Therefore, the scanning operation is controlled from operator workstation 105 through PET scanner controller 116.

Detector ring assembly 102 includes a plurality of detector units (e.g., in the GE Discovery™ ST PET system, there are 420 crystals per ring, and 24 rings in the scanner). For example, detector ring assembly 102 includes a detector 117, a detector 118, and several other detectors. Detector 117, like the other detectors, includes a set of scintillator crystals arranged in a matrix that is disposed in front of a plurality of photomultiplier tubes (e.g., four tubes). When a photon collides with a crystal on a detector, it produces a scintilla on the crystal. Each photomultiplier tube produces an analog signal on communication line 119 when a scintillation event occurs. A set of acquisition circuits 120 is provided to receive these analog signals. Acquisition circuits 120 produce digital signals indicating the 3-dimensional (3D) location and total energy of the event. Acquisition circuits 120 also produce an event detection pulse, which indicates the time or moment the scintillation event occurred. These digital signals are transmitted through a communication link, for example, a cable, to an event locator circuit 122 in data acquisition processor 106.

Data acquisition processor 106 includes event locator circuit 122, an acquisition CPU 124 and a coincidence detector 126. Data acquisition processor 106 periodically samples the signals produced by acquisition circuits 120. Acquisition CPU 124 controls communications on a back-plane bus 128 and on communication link 110. Event locator circuit 122 processes the information regarding each valid event and provides a set of digital numbers or values indicative of the detected event. For example, this information indicates when the event took place and the position of the scintillation crystal that detected the event. An event data packet is communicated to coincidence detector 126 through back-plane bus 128. Coincidence detector 126 receives the event data packets from event locator circuit 122 and determines if any two of the detected events are in coincidence. Coincidence is determined by a number of factors. First, the time markers in each event data packet must be within a predetermined time period, for example, 12.5 nanoseconds, of each other. Second, the LOR formed by a straight line joining the two detectors that detect the coincidence event should pass through the field of view in PET system 100. Events that cannot be paired are discarded.

Coincident event pairs are located and recorded as a coincidence data packet that is communicated through a communication link to a sorter 130 in image reconstruction processor 108.

Image reconstruction processor 108 includes sorter 130, a memory module 132, an image CPU 134, an array processor 136 and a back-plane bus 138. Sorter 130 counts all events occurring along each projection ray and organizes them into 3D data. This 3D data (or sinograms) is organized in one exemplary embodiment as a data array 140. Data array 140 is stored in memory module 132. Back-plane bus 138 is linked to communication link 110 through Image CPU 134. Image CPU 134 controls communication through back-plane bus 138. Array processor 136 is also connected to back-plane bus 138. Array processor 136 receives data array 140 as an input and reconstructs images in the form of image arrays 142. Resulting image arrays 142 are stored in memory module 132.

The images stored in image array 142 are communicated by image CPU 134 to operator workstation 105. Operator workstation 105 includes a CPU 144, a display device 146 and an input device 148. CPU 144 connects to communication link 110 and receives inputs (e.g., user commands) from input device 148. Input device 148 may be, for example, a keyboard, mouse, or a touch-screen panel. Through input device 148 and associated control panel switches, the operator can control the calibration of PET system 100 and the positioning of object 109 for a scan. Similarly, the operator can control the display of the resulting image on display device 146 and perform image-enhancement functions using programs executed by workstation CPU 144.

In general, the data array received by array processor 136 has to be corrected for errors before being reconstructed. This level of correction may be based on, for example, a desired or required resolution level for a reconstructed image. One of the corrections is removing scatter coincidences from the image data.

Figure 2:
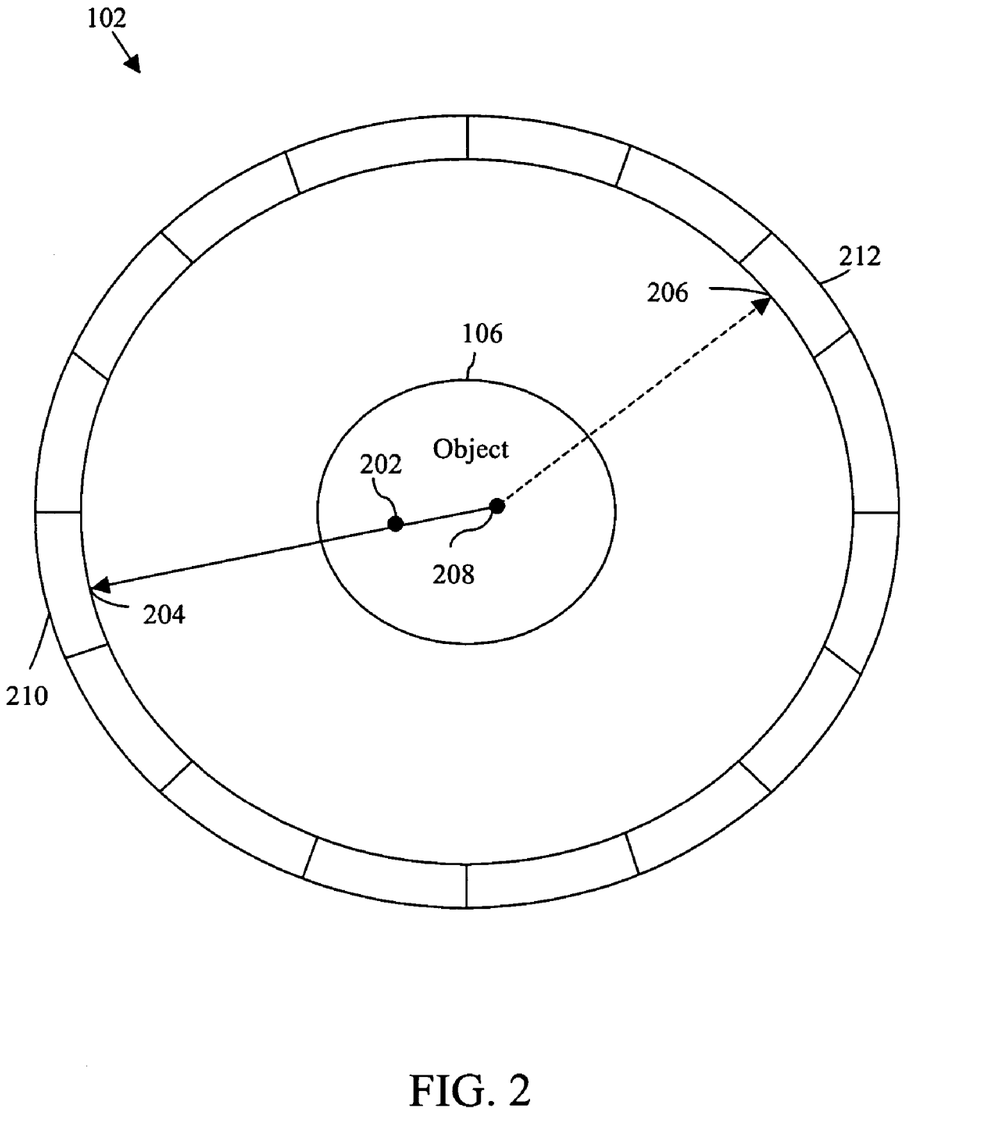
FIG. 2 illustrates a single scatter coincidence in a PET system.

FIG. 2 illustrates a single scatter coincidence. As shown, detector ring assembly 102 includes a plurality of detector elements. An annihilation event occurs at an annihilation point 202 inside object 109. The annihilation event produces a photon 204 and a scattered photon 206. Scattered photon 206 is scattered at a scattering point 208 inside object 109. A detector element 210 that is part of detector ring assembly 102 detects photon 204. Detector element 210 further records the time, $t^1$, at which photon 204 is detected. Scattered photon 206 may be detected by detector element 212 or any one of the detector elements within detector ring assembly 102. Detector element 212 records the time, $t_2$, at which the scattered photon 206 is detected. Detector element 210 and detector element 212 form a detector pair. The detector element pair 210 and 212 map to a unique sinogram bin with indices, r and $\theta$. The indices r and $\theta$ denote the radial distance from the center of the detector ring and the angle of the line joining 210 and 212 from the horizontal axis, respectively. The difference between detection times for 204 and 206, $(t_2-t_1)$ maps to a unique time bin index for the time-of-flight scatter sinogram. For each of the plurality of detector pairs, the total number of annihilation events and the time at which each event is recorded is sent to processor 104 (shown in FIG. 1). Based on the received information, the detected events are binned into sinograms with indices r, $\theta$ and t to generate the time-of-flight scatter sinogram $S(r,\theta,t)$.

Figure 3:
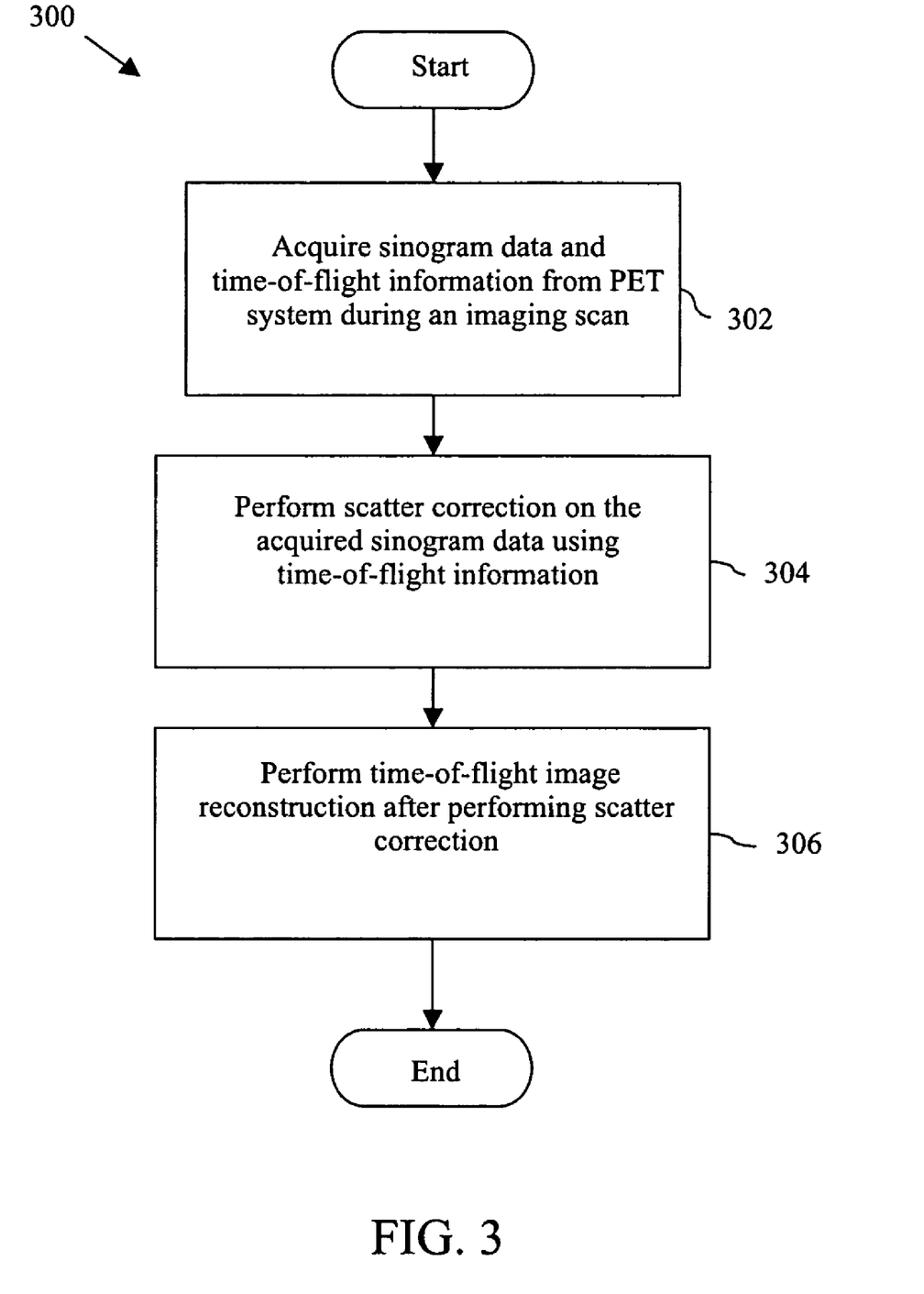
FIG. 3 is a flowchart illustrating a method for controlling a PET system in accordance with an exemplary embodiment of the invention.

FIG. 3 is a flowchart illustrating a method 300 for controlling PET system 100 (shown in FIG. 1) in accordance with an exemplary embodiment of the invention. At 302, processor 104 (shown in FIG. 1) acquires sinogram data from detector ring assembly 102 (shown in FIG. 1) during an imaging scan performed using PET system 100. Processor 104 further acquires time-of-flight information from detector ring assembly 102. Time-of-flight information may be represented either as time-of-flight timing information or time-of-flight distance information. Time-of-flight timing information is the difference between the times that the pair of detectors detect their respective photons. Time-of-flight distance information is the distance from the midpoint of the line between the detectors and the estimated location of the annihilation event, based on the TOF data. The time-of-flight distance information is calculated by multiplying the time-of-flight timing information by one-half of the speed of light.

The time-of-flight distance information is calculated for each of the plurality of detector pairs and scatter points in PET system 100. For example, as illustrated in FIG. 2, time-of-flight distance information includes the distance from annihilation point 202 to detector element 210. The distance is equal to $L_1$. The distance from annihilation point 202 to detector element 212 along the line of scatter coincidence is also calculated. This distance is equal to $(L_2+l)$, where $L_2$ is the distance from scattering point 208 to detector element 212, and l is the distance from the annihilation point 202 to scattering point 208. The distances $L_1$, l and $L_2$ are calculated using techniques as are known. In an embodiment of the invention, $L_1$, l and $L_2$ may be calculated directly from the spatial coordinates for the annihilation point 202, scatter point 208, detector element 210 and detector element 212. For example, if the spatial co-ordinates are $(x_1, y_1, z_1)$, $(x_2, y_2, z_2)$, $(x_3, y_3, z_3)$ and $(x_4, y_4, z_4)$ for the annihilation point 202, scatter point 208, detector element 210 a element 212, respectively, then $$L_1 = \sqrt{(x_1-x_3)^2+(y_1-y_3)^2+(z_1-z_3)^2}$$

$$L_2 = \sqrt{(x_2-x_4)^2+(y_2-y_4)^2+(z_2-z_4)^2}$$

$$l = \sqrt{(x_2-x_1)^2+(y_2-y_1)^2+(z_2-z_1)^2}$$

At 304, processor 104 performs scatter correction on the acquired sinogram data using the time-of-flight information. Performing scatter correction on the acquired sinogram data includes estimating the scatter coincidence data for each detector pair including the time-of-flight information and subtracting it from the measured sinogram. The time-of-flight scatter estimate, which is subtracted from the acquired sinogram data, must take into account timing noise, defined as the uncertainty in measuring the time-of-flight timing information. This is done by convolving the time-noise-free scatter sinogram estimate by the timing response of the detector. The timing response is characterized by its full width at half-maximum (FWHM), and is generally assumed Gaussian in shape. The convolving technique involves defining a convolution kernel of the form h(t), which represents the timing response of the detector (peaked at h=0, falling off in a Gaussian shape for h<>0), and performing an operation as follows:

$$S_{out}(r, \theta, t) = \sum_{t'} S_{in}(r, \theta, t')h(t-t')$$

Performing scatter correction further includes using a single scatter estimator to determine the required scatter correction.

At 306, processor 104 performs image reconstruction after correcting the image data of scatter coincidences. The image reconstruction is performed using known reconstruction techniques.

Figure 4:
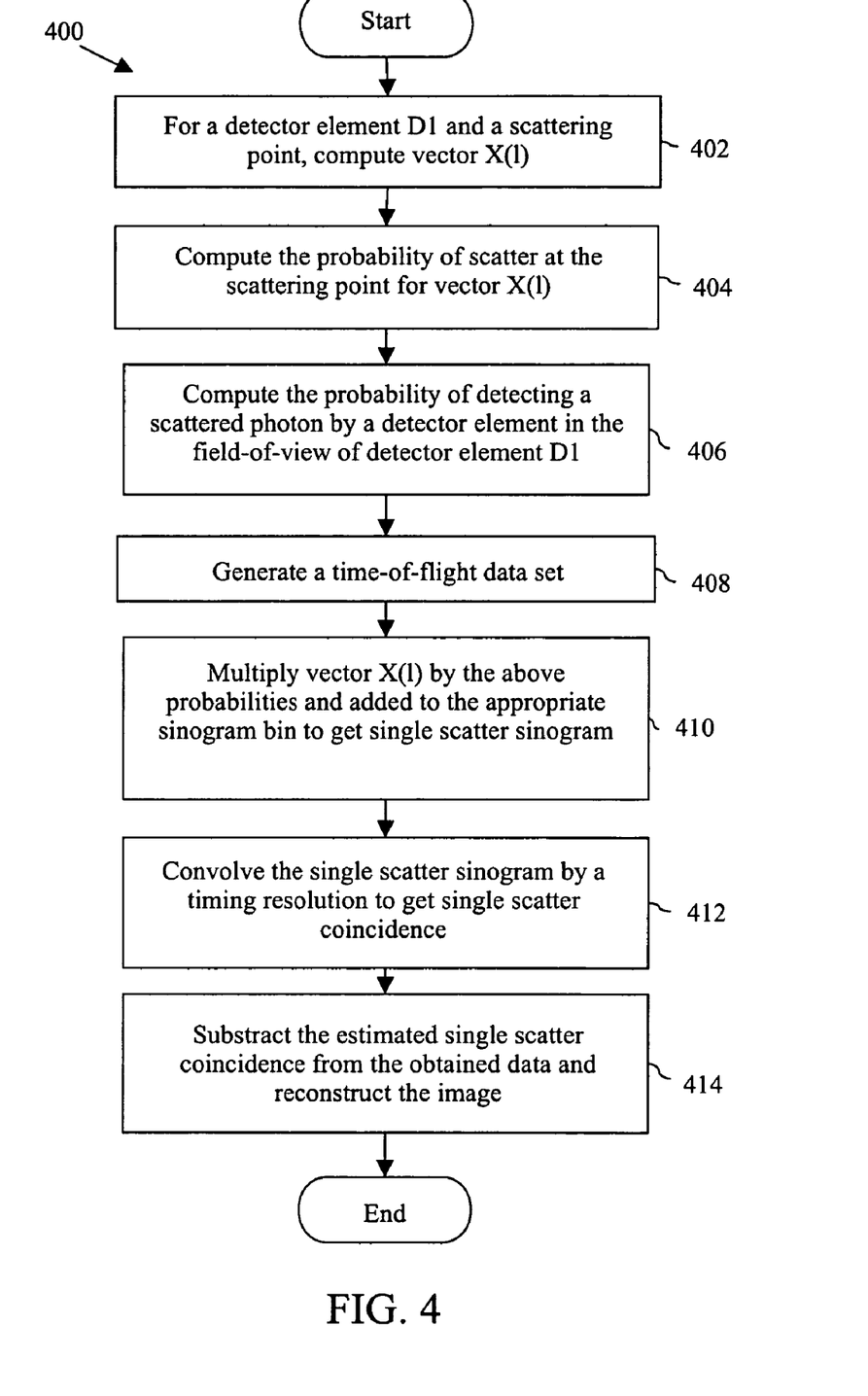
FIG. 4 is a flowchart illustrating a method for performing scatter correction in a PET system in accordance with an exemplary embodiment of the invention.

FIG. 4 is a flowchart illustrating an exemplary method 400 for performing scatter estimation and correction in PET system 100 (shown in FIG. 1) in accordance with an exemplary embodiment of the invention. At 402, processor 104 (shown in FIG. 1) computes vector X(1) for detector element 210 and scattering point 208. The elements of vector X(1) are the activities at every annihilation point 202 in object 109 from scattering point 208 towards detector 210. At 404, processor 104 calculates the probability of scatter at scattering point 208 for vector X(1). At 406, processor 104 calculates the probability of detecting a scattered photon for a detector element lying in the field-of-view of detector element 210. A detector element lies in the field-of-view of detector element 210 if the line joining the two detector elements passes through the imaging volume of the PET scanner. At 408, processor 104 generates a time-of-flight data set. Processor 104 computes the travel distance for the unscattered photon 204 and scattered photon 206. The travel distance $L_1$ for unscattered photon 204 is the distance from each annihilation point 202 to detector element 210. The travel distance scattered photon 206 is the sum of the l, which is the distance from each annihilation point 202 to scatter point 208, and $L_2$, which is the distance from scatter point 208 to detector element 212. The time-of-flight distance difference is equal to $L_1-l-L_2$ for every element of vector X(1). At 410, vector X(1) is multiplied by the determined probabilities and added to the appropriate scatter sinogram bins, $S(r,\theta,t)$ where r and $\theta$ are determined from detector elements 210 and 212 and t is determined from the time-of-flight distance differences for each source element in X(1). The above steps are performed for each scattering point and detector pair in PET system 100 to obtain an estimate of each single scatter coincidence sinogram. At 412, the scatter coincidence sinogram is convolved by the timing resolution, h(t), using known convolution techniques to obtain an estimate of the scatter coincidence. At 414, the estimate of the scatter coincidence is subtracted from the sinogram data and reconstructed to obtain a corrected image data.

Figure 5:
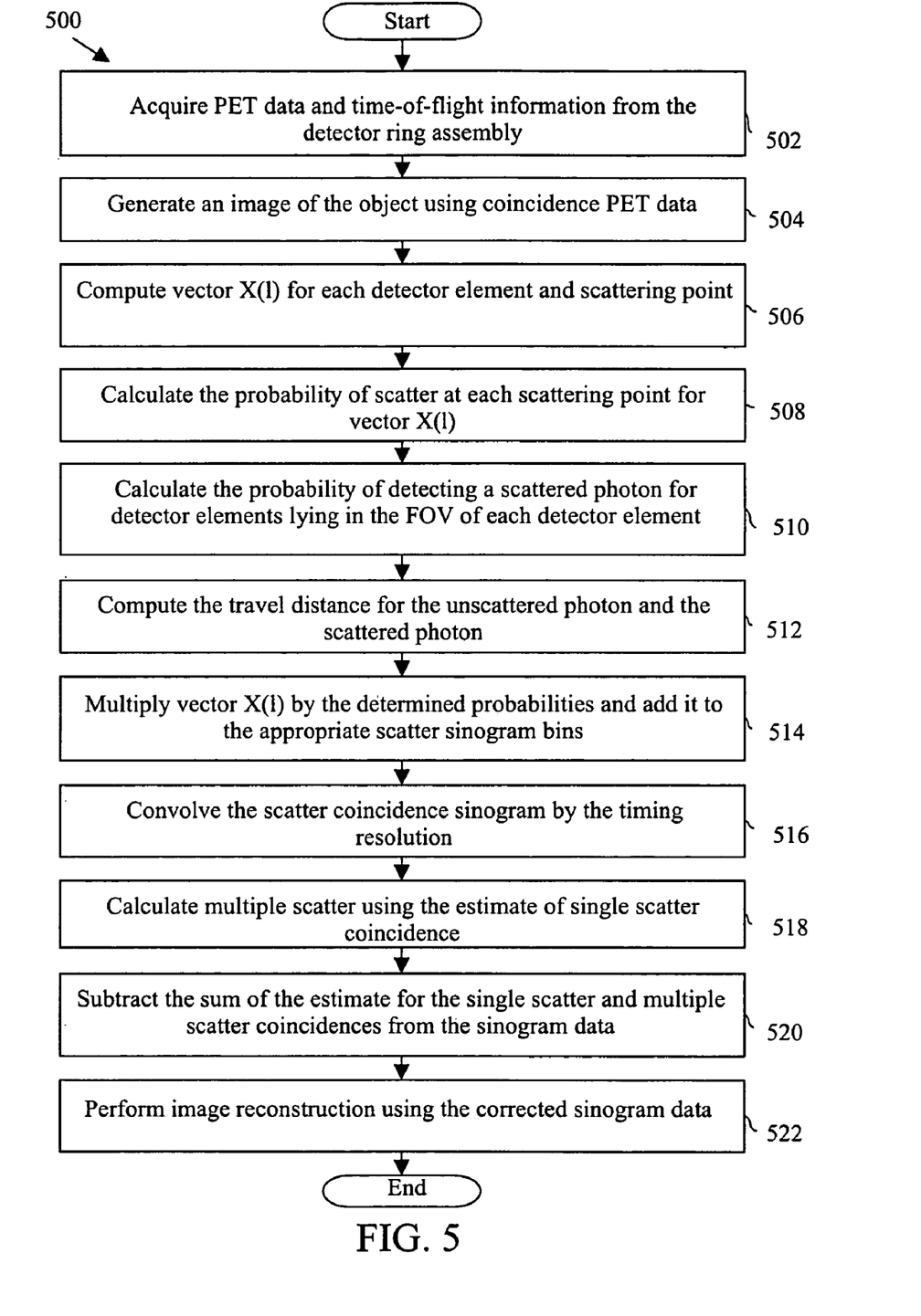
FIG. 5 is a flowchart illustrating a method for performing scatter correction on image data using time-of-flight information in accordance with an exemplary embodiment of the invention.

FIG. 5 is a flowchart illustrating a method 500 for performing scatter estimation and correction on the PET data using time-of-flight information acquired by PET system 100 (shown in FIG. 1). At 502, processor 104 acquires coincidence PET data and time-of-flight information from detector ring assembly 102 (shown in FIG. 1). The time-of-flight information is stored as the difference in the time at which coincident photons are detected by a detector pair in detector ring assembly 102. At 504, an image of object 106 is generated using coincidence PET data. At 506, processor 104 (shown in FIG. 1) computes vector X(1) for detector element 210 and a scattering point 208. The elements of vector X(1) are the activities at every annihilation point 202 in object 109 from scattering point 208 towards detector 210. At 508, processor 104 calculates the probability of scatter at scattering point 208 for vector X(1). At 510, processor 104 calculates the probability of detecting a scattered photon for a detector element lying in the field-of-view of detector element 210. A detector element lies in the field-of-view of detector element 210 if the line joining the two detector elements passes through the imaging volume of the PET scanner. At 512, processor 104 computes the travel distance for unscattered photon 204 and scattered photon 206. The travel distance $L_1$ for the unscattered photon 204 is the distance from each annihilation point 202 to detector element 210. The travel distance for scattered photon 206 is the sum of the l, which is the distance from each annihilation point 202 to scatter point 208, and $L_2$, which is the distance from scatter point 208 to detector element 212. The time-of-flight distance difference is equal to $L_1-l-L_2$ for every element of vector X(1).

At 514, vector X(1) is multiplied by the determined probabilities and added to the appropriate scatter sinogram bins, S(r,θ,t) where r and θ are determined from detector elements 210 and 212 and t is determined from the time-of-flight distance differences for each source element in X(1). The above steps are performed for each scattering point and detector pair in PET system 100 to obtain an estimate of each single scatter coincidence sinogram. At 516, the scatter coincidence sinogram is convolved by the timing resolution, h(t), using known convolution techniques to obtain an estimate of the scatter coincidence. At 518, multiple scatter is calculated using the estimate of single scatter coincidence. At 520, the sum of the estimate for the single scatter coincidence and multiple scatter coincidence is subtracted from the sinogram data to generate the scatter corrected sinogram. Further, at 522, image reconstruction is performed using the corrected sinogram data in order to obtain a reconstructed image.

In one exemplary embodiment of the invention, the process of convolving time-of-flight spectrum by the time-of-flight response may be performed after the method 500 shown in FIG. 5 is complete.

Various embodiments of the invention provide a method that provides improved scatter estimation using time-of-flight information for scatter estimation. Thus, images having improved quality and resolution are provided.

The various embodiments described herein may be embodied or implemented in a computer system, for example, as part of PET system 100. Typical examples of a computer system include a general-purpose computer, a programmed microprocessor, a micro-controller, a peripheral integrated circuit element, and other devices or arrangements of devices that are capable of implementing the various embodiments of the invention.

The computer system generally includes a computer, an input device, a display unit and the Internet. The computer includes a microprocessor. Microprocessor is connected to a communication bus. Computer also includes a memory. Memory may include Random Access Memory (RAM) and Read Only Memory (ROM). The computer system further may include a storage device, such as, for example, a hard disk drive or a removable storage drive such as a floppy disk drive, optical disk drive and the like. The storage device also can be other similar means for loading computer programs or other instructions into the computer system.

The computer system executes a set of instructions that are stored in one or more storage elements in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the various methods of various embodiments of the present invention. The set of instructions may be in the form of a software program. The software may be in various forms such as system software or application software. Further, the software may be in the form of a collection of separate programs, a program module with a larger program or a portion of a program module. The software also may include modular programming in the form of object-oriented programming. The processing of input data by the processing machine may be in response to user commands, or in response to results of previous processing, or in response to a request made by another processing machine.

While the invention has been described in terms of various specific embodiments, those skilled in the art will recognize that the invention can be practiced with modification within the spirit and scope of the claims.

What is claimed is:

1. A method for controlling a positron emission tomography (PET) system, said method comprising:
   acquiring image data and time-of-flight information from the PET system during an imaging scan using the PET system; and
   performing scatter correction on the acquired image data using the acquired time-of-flight information.

2. A method in accordance with claim 1 further comprising generating a time-of-flight data set for performing scatter correction.

3. A method in accordance with claim 1 further comprising determining time-of-flight distance information based on differential time-of-flight timing information.

4. A method in accordance with claim 1 wherein acquiring time-of-flight information comprises acquiring differential time-of-flight timing information.

5. A method in accordance with claim 1 wherein acquiring time-of-flight information comprises acquiring time-of-flight information for each of a plurality of detector pairs and scatter points in the PET system.

6. A method in accordance with claim 1 further comprising determining a scatter profile for each of a plurality of detector pairs in the PET system.

7. A method in accordance with claim 1 wherein performing scatter correction comprises convolving a calculated time-of-flight scatter estimate by a timing response of the PET system.

8. A method in accordance with claim 1 further comprising performing time-of-flight image reconstruction after performing scatter correction.

9. A method in accordance with claim 1 wherein acquiring time-of-flight information comprises measuring a time-of-flight time difference between detection of two photons detected by a detector pair in the PET system.

10. A method in accordance with claim 1 wherein acquiring time-of-flight information comprises determining a distance along a line of scatter coincidence from an annihilation point to each of a detector pair.

11. A method in accordance with claim 1 further comprising using a single scatter estimator to determine the scatter correction.

12. A method for performing scatter correction in a time-of-flight positron emission tomography (TOF PET) system, said method comprising:
   determining a time-of-flight difference between detection of a pair of photons at a corresponding detector pairs in the TOF PET system; and
   scatter correcting image data acquired by the TOF PET system using the determined time-of-flight difference.

13. A method in accordance with claim 12 wherein the determining comprises measuring a time-of-flight distance difference between detector pairs corresponding to scatter events.

14. A method in accordance with claim 12 further comprising convolving a calculated time-of-flight scatter estimate by a timing response of the TOF PET system.

15. A method in accordance with claim 12 further comprising generating a single scatter estimate using time-of-flight information including the time-of-flight difference.

16. A method in accordance with claim 12 wherein the time-of-flight difference is determined for a plurality scatter points and further comprising generating time-of-flight profiles for each of the scatter points.

17. A method in accordance with claim 12 wherein the time-of-flight difference is a distance difference and further comprising determining a time-of-flight timing difference based on the distance difference.

18. A positron emission tomography (PET) system comprising:
  a plurality of detector elements for performing a PET scan; and
  a processor configured to receive image data and time-of-flight information from the plurality of detector elements during an imaging scan using the PET system, and to scatter correct the acquired image data using the acquired time-of-flight information.

19. A PET system in accordance with claim 18 wherein the time-of-flight information comprises time-of-flight distance information.

20. A PET system in accordance with claim 18 wherein the processor is further configured to generate scatter profiles for a plurality of scatter points.

* * * * *